United States Patent
Bugg (10) Patent No.: US 10,130,165 B2
(45) Date of Patent: Nov. 20, 2018

(54) DRY BRUSH ASSEMBLY AND METHOD OF OPERATING DRY BRUSH ASSEMBLY FOR CLEANING SOLAR PANEL MODULES

(71) Applicant: First Solar, Inc., Perrysburg, OH (US)

(72) Inventor: Eddie Bugg, Perrysburg, OH (US)

(73) Assignee: FIRST SOLAR, INC., Perrysburg, OH (US)

( * ) Notice: Subject to any disclaimer, the term of this patent is extended or adjusted under 35 U.S.C. 154(b) by 382 days.

(21) Appl. No.: 14/800,170

(22) Filed: Jul. 15, 2015

(65) Prior Publication Data

US 2016/0015164 A1 Jan. 21, 2016

Related U.S. Application Data

(60) Provisional application No. 62/024,505, filed on Jul. 15, 2014.

(51) Int. Cl.
| | |
|---|---|
| *A46B 13/00* | (2006.01) |
| *A46B 13/08* | (2006.01) |
| *F24J 2/46* | (2006.01) |
| *H02S 40/10* | (2014.01) |
| *B08B 1/00* | (2006.01) |

(52) U.S. Cl.
CPC ............. *A46B 13/08* (2013.01); *A46B 13/00* (2013.01); *B08B 1/008* (2013.01); *F24J 2/461* (2013.01); *H02S 40/10* (2014.12); *Y02E 10/40* (2013.01)

(58) Field of Classification Search
CPC ......... A46B 13/00; A46B 13/02; A46B 13/08; F24J 2/461; H02S 40/10
USPC .................................................. 15/21.1, 22.1
See application file for complete search history.

(56) References Cited

U.S. PATENT DOCUMENTS

| | | | |
|---|---|---|---|
| 8,500,918 B1 | 8/2013 | Meller et al. | |
| 8,650,693 B2* | 2/2014 | Singh | B08B 1/008 15/77 |
| 2012/0090107 A1* | 4/2012 | Jaeger | A46B 13/06 15/21.1 |
| 2013/0206173 A1 | 8/2013 | Zijlstra | |
| 2015/0082559 A1* | 3/2015 | Lacalle Bayo | F24S 23/74 15/21.1 |

FOREIGN PATENT DOCUMENTS

| | | |
|---|---|---|
| CN | 201459657 U | 5/2010 |
| CN | 103071634 A | 5/2013 |
| CN | 202936753 U | 5/2013 |

* cited by examiner

*Primary Examiner* — Randall Chin
(74) *Attorney, Agent, or Firm* — Michael E. Dockins; Shumaker, Loop & Kendrick, LLP (57) ABSTRACT

A solar panel cleaning brush assembly including a trolley frame having parallel first and second side frame members. A first guide member is connected to the first side frame member. A second guide member is connected to the second side frame member. A first belt rotatably disposed about a perimeter of the first guide member directly contacts a first array edge of a solar panel array. A second belt rotatably disposed about a perimeter of the second guide member directly contacts a second array edge of the solar panel array. At least one brush set is connected to the trolley frame, the at least one brush set having multiple fixed, non-rotating brushes each frictionally contacting and spanning across a module face of individual ones of multiple solar panel modules defining a solar panel array.

20 Claims, 8 Drawing Sheets

DRY BRUSH ASSEMBLY AND METHOD OF OPERATING DRY BRUSH ASSEMBLY FOR CLEANING SOLAR PANEL MODULES

CROSS-REFERENCE TO RELATED APPLICATION

This application claims the benefit of priority of U.S. Provisional Patent Application Ser. No. 62/024,505 filed on Jul. 15, 2014 hereby incorporated herein by reference in its entirety.

FIELD

The present disclosure relates to solar arrays and more specifically to devices and methods for cleaning solar panel modules of solar arrays.

BACKGROUND

This section provides background information related to the present disclosure which is not necessarily prior art.

Photovoltaic modules, devices, or cells, can include multiple layers (or coatings) created on a substrate (or superstrate). For example, a photovoltaic device can include a barrier or window layer, a transparent conductive oxide layer, a buffer layer, and a semiconductor layer formed in a stack on a substrate. Each layer may in turn include more than one layer or film. For example, a semiconductor window layer and a semiconductor absorber layer together can be considered a semiconductor layer. Additionally, each layer can cover all or a portion of the device and/or all or a portion of a layer or a substrate underlying the layer. For example, a "layer" can include any amount of any material that contacts all or a portion of a surface.

A glass layer is typically the top or outer-most layer in a single-junction photovoltaic cell of a photovoltaic (PV) device and is formed from a high band gap material to allow transmittance of sunlight to underlying layers of the device. The glass layer is exposed to atmosphere and can become coated with dust, dirt, sand, and the like during use, collectively referred to hereinafter as "dust". As dust develops and thickens, transmittance of sunlight through the glass layer to underlying layers is diminished, reducing the efficiency of the PV device. Methods to clean PV device glass layers have therefore been developed that include water washing systems, powered, and robotic cleaning systems. Such systems have substantial hardware costs, require additional power to operate, and if water is used require a substantial source of water. Alternate, less power intensive systems and systems that do not require water as a cleaning agent are therefore desirable.

SUMMARY

This section provides a general summary of the disclosure, and is not a comprehensive disclosure of its full scope or all of its features.

According to several aspects, a modular solar panel cleaning brush assembly includes a trolley frame having parallel first and second side frame members. A first guide member is connected to one of the first side frame members. At least a first belt rotatably disposed about a perimeter of the first guide member directly contacts an array edge of a solar panel array. At least one brush set is connected to the trolley frame, the at least one brush set having multiple fixed, non-rotating brushes each frictionally contacting and spanning across a module face of individual ones of multiple solar panel modules defining the solar panel array.

According to other aspects, a second belt can also be rotatably disposed about a perimeter of a second guide member which directly contacts a second array edge of the solar panel array. Each belt contacts multiple belt sleeves positioned about a perimeter of the first and second guide members. The belt sleeves are each rotatably connected to the first and second guide members. According to several embodiments, the belt defines a tank tread at least on an interior facing surface having repeating raised features engaging complementary raised features of the belt sleeves to provide positive frictional contact.

According to further aspects, the at least one brush set includes first and second brush sets connected to the trolley frame. The first and second brush sets each have multiple fixed, non-rotating brushes each frictionally contacting and spanning across a module face of individual ones of multiple solar panel modules defining the solar panel array. The first brush set is connected to the first cross frame member, and the second brush set is connected to the second cross frame member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
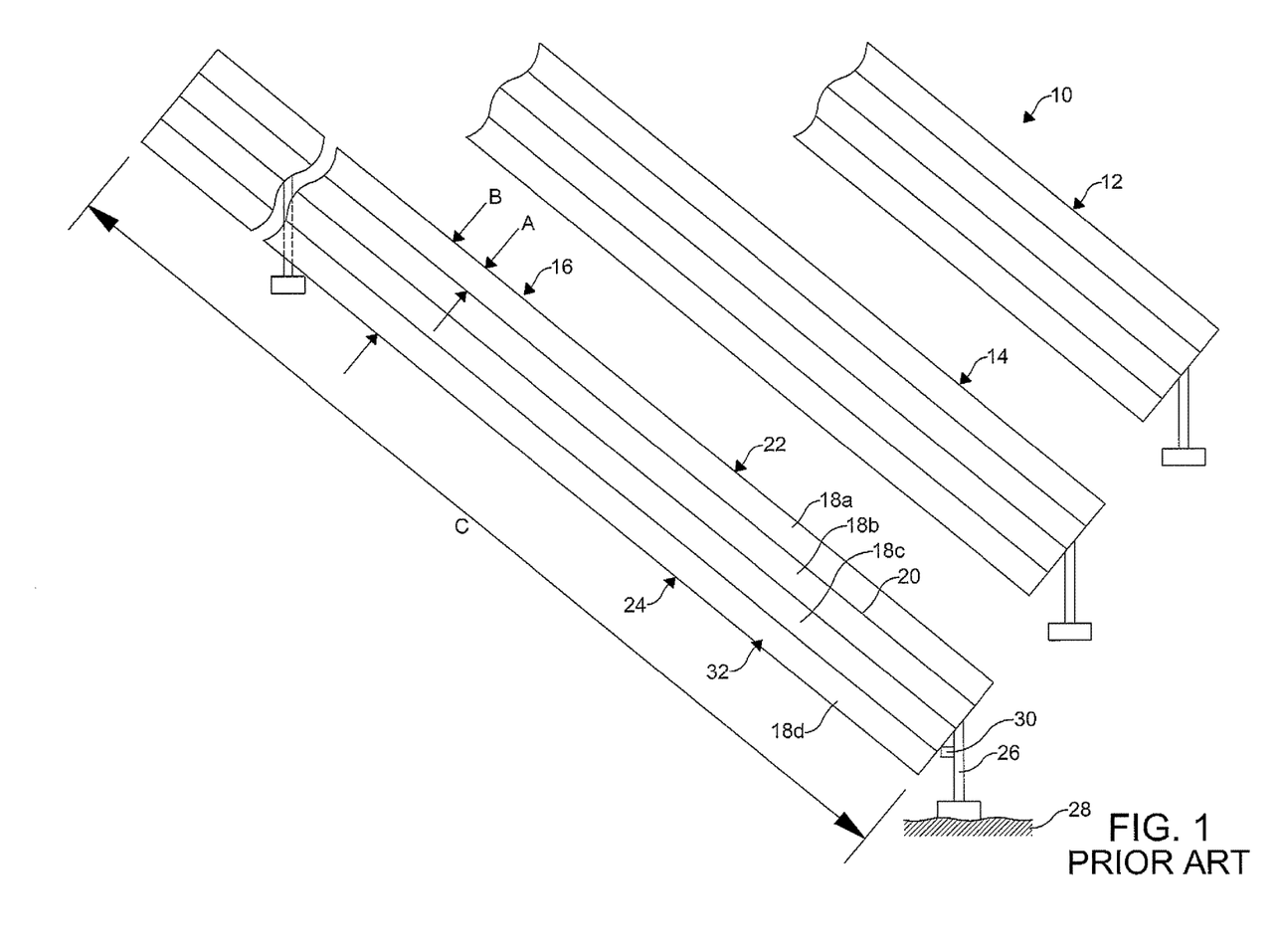
FIG. 1 is a top right perspective view of a solar panel field of known design.
Figure 2:
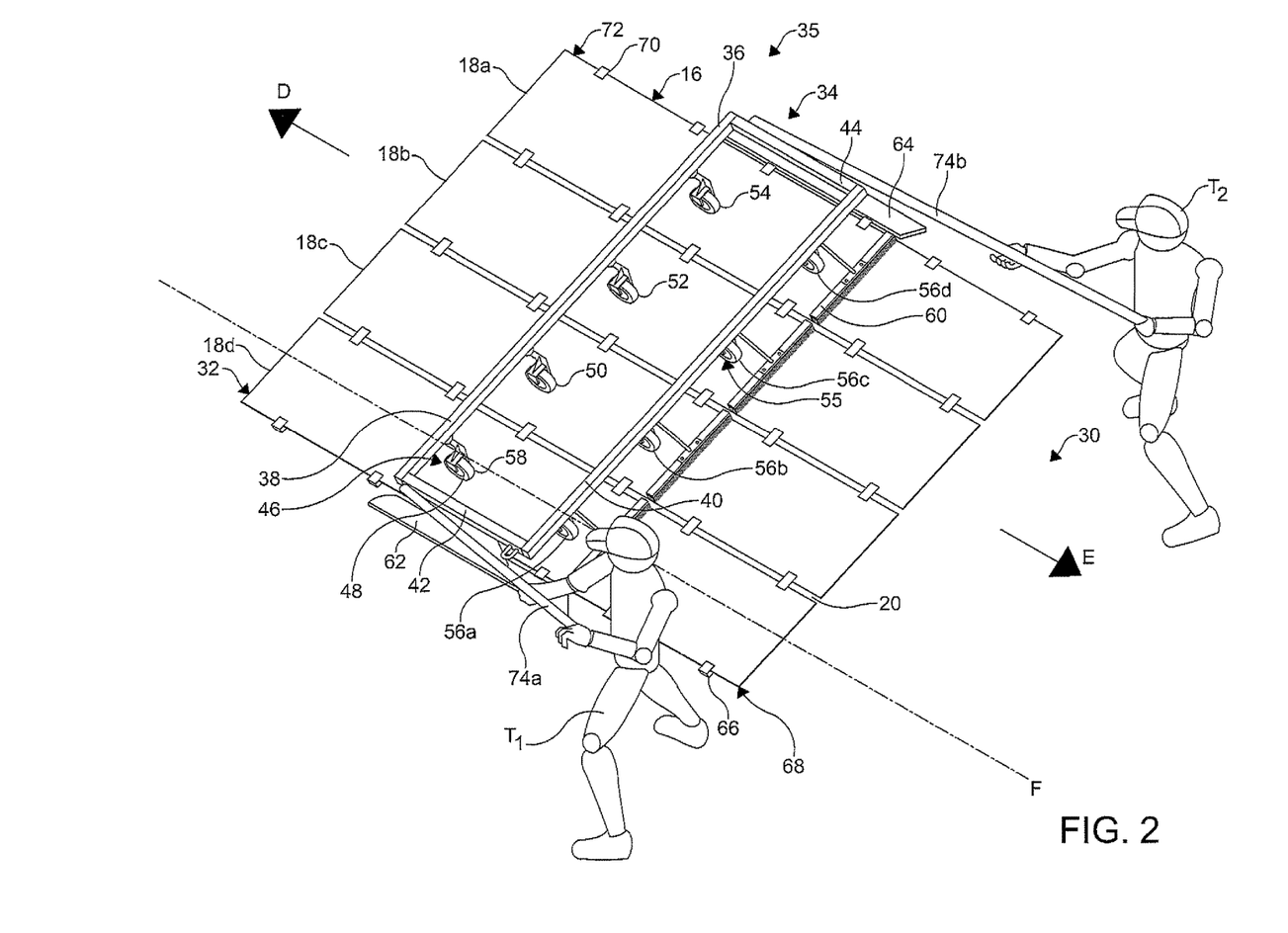
FIG. 2 is a top left perspective view of a modular dry brush trolley assembly of the present disclosure.

Referring generally to FIGS. 1-2, a solar panel field 10 commonly includes multiple solar panel arrays, such as for example, first, second and third solar panel arrays 12, 14, 16. The quantity of solar panel arrays is not limiting, as solar panel fields 10 commonly include dozens or hundreds of solar panel arrays. Each of the solar panel arrays such as third solar panel array 16 can include multiple PV panel modules. In the exemplary embodiment of FIGS. 1-2 each solar panel array includes four (4) panel modules including first, second, third and fourth panel modules 18a, 18b, 18c, 18d. Each of the first, second, third and fourth panel modules 18a, 18b, 18c, 18d is substantially identical to the other panel modules. The quantity of panel modules is not limiting to this disclosure, and each solar panel array can commonly include two, four, six, eight or non-even quantities of panel modules.

Each of the first, second, third and fourth panel modules 18a, 18b, 18c, 18d have a common width "A" and successive ones of the panel modules are separated by a common width module gap 20. A first array edge 22 and an oppositely directed second array edge 24 define outer edges of each of the first, second and third solar panel arrays 12, 14, 16. An overall solar panel array width "B" and a common total solar panel array length "C" are maintained for each of the first, second and third solar panel arrays 12, 14, 16. Multiple array stanchions 26 are provided to support each solar panel array at a similar height above a ground surface 28. One or more orientation motors 30 connected to structure of the array stanchions 26 can be provided, which operate to change an orientation angle of the individual solar panel array with respect to the ground surface to direct a plurality of module faces 32 of each solar panel array toward the sun as a position of the sun with respect to the solar panel arrays changes over time. The commonality of the solar panel array width "B" between the individual solar panel arrays 12, 14, 16 is relied on for cleaning dirt and contaminants from the module faces 32 of the first, second, third and fourth panel modules 18a, 18b, 18c, 18d as will be described in greater detail in FIGS. 2-5.

Referring more specifically to FIG. 2, a modular dry brush trolley assembly 34 provides one embodiment of a solar panel module cleaning system 35 of the present disclosure. Modular dry brush trolley assembly 34 includes a trolley frame 36 made for example of aluminum or other lightweight metal, polymeric, or composite material tubing. According to several embodiments trolley frame 36 defines a rectangular shape having parallel first and second cross frame members 38, 40. A length of the first and second cross frame members 38, 40 can be varied by use of shorter or longer members or by the use of cross frame sub-members such that a width of the trolley frame 36 corresponds to the width of an array having one, two, three, four, or more panel modules such as the four panel modules 18a, 18b, 18c, 18d presented in FIG. 2.

The first and second cross frame members 38, 40 are optimally oriented substantially perpendicular to individual module longitudinal centerlines "F" of each of the first, second, third and fourth panel modules 18a, 18b, 18c, 18d. This perpendicular orientation can vary by several degrees as the modular dry brush trolley assembly 34 is displaced in either a first cleaning direction "D" or an oppositely directed second cleaning direction "E", by manual force applied by first and second technicians $T_1$, $T_2$ positioned on opposite sides of the solar panel array.

Opposed first and second side frame members 42, 44 are fixedly connected at opposite ends of both first and second cross frame members 38, 40 to complete and rigidly retain the rectangular shape of modular dry brush trolley assembly 34. A first tire set 46 is connected to the first cross frame member 38. First tire set 46 includes one tire for each of the panel modules, therefore according to several embodiments first tire set 46 includes first, second, third and fourth tires 48, 50, 52, 54, which can be individually aligned with the module longitudinal centerline "F" of each of the first, second, third or fourth panel modules 18a, 118b, 18c, 18d of one of the solar panel arrays of solar panel field 10. First, second, third and fourth tires 48, 50, 52, 54 are each made of a resilient material such as a polymeric rubber or similar material to prevent contact damage to the module faces 32 of the panel modules. A second tire set 55 is connected to the second cross frame member 40 and according to several embodiments also includes four tires such as fifth, sixth, seventh and eighth tires 56a, 56b, 56c, 56d, with each of the four tires of the second tire set 55 aligned with one of the four tires of the first tire set 46, such that two tires of the dry brush trolley assembly 34 are in direct contact with the module face 32 of each of the first, second, third and fourth panel modules 18a, 18b, 18c, 18d. According to further aspects, the quantity of tires can be reduced such that two tires contact the outermost panel modules, with two tires provided to contact selected ones of the inner panel modules.

A first brush set 58 is connected to the first cross frame member 38 and a second brush set 60 is connected to the second cross frame member 40. The first and second brush sets 58, 60 which are used to clean the module faces 32 will be described in greater detail in reference to FIGS. 4-6, and the quantity of brush sets is directly set to match the quantity of panel modules. To maintain alignment of the dry brush trolley assembly 34 during travel in either of the first or second cleaning directions "A" or "B", a first guide member 62 is connected to the first side frame member 42 and a second guide member 64 is connected to second side frame member 44. It is understood that only a single guide member may be used, as desired. For the first, second and third solar panel arrays 12, 14, 16 shown in FIG. 1 having opposed first and second array edges 22, 24 the first guide member 62 makes direct contact with the first array edge 22 and the second guide member 64 makes direct contact with the second array edge 24.

According to other embodiments and as shown is FIG. 2, during cleaning travel of dry brush trolley assembly 34 the first guide member 62 maintains direct contact with at least two of a plurality of first edge posts 66 which extend outwardly of a first module edge 68. Similarly, the second guide member 64 maintains direct contact with at least two of a plurality of second edge posts 70 oppositely directed with respect to the first edge posts 66, which extend outwardly of a second module edge 72.

To manually displace the dry brush trolley assembly 34, first technician $T_1$ who is positioned proximate to either the first array edge 22 or the first module edge 68 applies force to a first force application device 74a such as a tube or pole, which is releasably connected to the first side frame member 42, thereby for example applying force to displace the brush trolley assembly 34 in the first cleaning direction "D". Simultaneously, second technician $T_2$ who is positioned proximate to either second array edge 24 or second module edge 72 applies force to a second force application device 74b which is releasably connected to the second side frame member 44. Second technician $T_2$ applies a substantially equal force as the first technician $T_1$ to displace the brush trolley assembly 34 in the first cleaning direction "D". By displacing the brush trolley assembly 34 along the entire array length "C", both first and second brush sets 58, 60 contact the entire module face 32 of each of the first, second, third and fourth panel modules 18a, 18b, 18c, 18d to thereby clean dust from each module face 32. It is understood that the first and/or the second force application devices 74a, 74b may be telescoping or otherwise adjustable in length to accommodate varying heights and strengths of technicians.

According to other aspects, the first and the second force application devices 74*a*, 74*b* can be replaced with similar rigid or semi-rigid devices for application of the force necessary to displace the brush trolley assembly 34. According to further aspects, the first and second technicians T₁, T₂ can each apply a pulling force, for example using ropes, flexible members, or the like as the first and second force application devices 74*a*, 74*b*, and pulling in lieu of pushing the brush trolley assembly 34.

Referring more specifically to FIG. 3 and again to FIGS. 1-2, each of the first and second edge posts 66, 70 extends outwardly away from the first module edge 68 or the second module edge 72, and includes a planar post outer face 76 which is oriented substantially perpendicular to the module faces 32. To promote ease of displacement of dry brush trolley assembly 34, a belt face 78 of a rotating flexible material belt 80 directly contacts the outer face 76 of successive ones of the first or second edge posts 66, 70, or in embodiments not having first or second edge posts 66, 70 directly contacts either the first or second array edge 22 or 24. Each of the first and second guide members 62, 64 includes one of the belts 80. Each belt 80 contacts multiple belt sleeves 82 positioned about a perimeter of the first and second guide members 62, 64. The belt sleeves 82 are each rotatably connected to the first and second guide members 62, 64 using guide pins 84, and the belt sleeves 82 individually rotate with respect to a longitudinal axis of one the guide pins 84 to which it is rotatably connected. According to several embodiments, the belt 80 defines a tank tread at least on an interior facing surface having repeating raised features engaging complementary raised features of the belt sleeves 82 to provide positive frictional contact.

Figure 3:
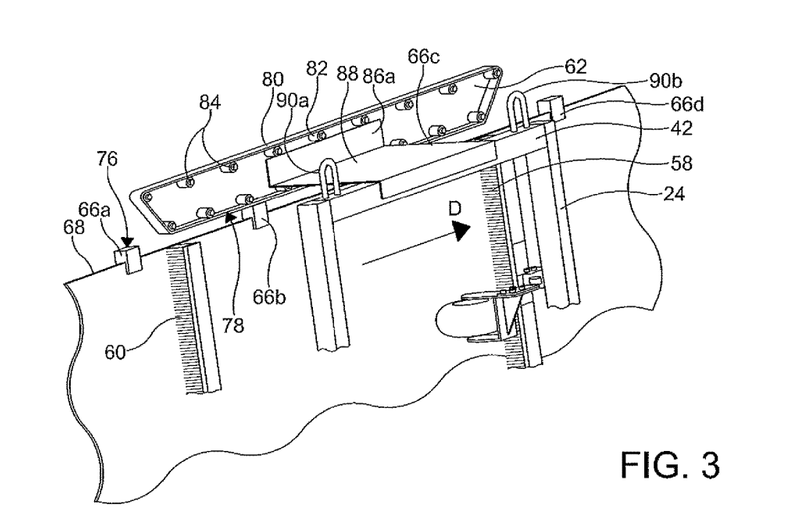
FIG. 3 is a top left perspective view looking forward of the dry brush trolley assembly of FIG. 2.

A connecting plate 86*a*, 86*b* is fixed to each of the first and second guide members 62, 64, inward of all of the respective guide pins 84 and belt sleeves 82, to allow free rotation of the belt 80. The connecting plates 86*a*, 86*b* (only connecting plate 86*a* is visible in this view) of each of the first and second guide members 62, 64 are then individually fixed to one of the first or second side frame members 42, 44 such as shown for first side frame member 42. A length of a plate web 88 of each of the connecting plates 86*a*, 86*b* is calculated to longitudinally align a portion of the belt 80 of each of the first and second guide members 62, 64 on one of the first or second module edges 68, 72 or on one of the first or second array edges 22, 24 when the tires of the first and second tire sets 46, 55 are in direct contact with the panel array module faces 32.

First and second force application connectors 90*a*, 90*b* are connected at opposite ends to each of the first and second side frame members 42, 44. The first force application device 74*a* is releasably connected to one of the first or second force application connectors 90*a*, 90*b* of first side frame member 42. The second force application device 74*b* is releasably connected to the same one of the first or second force application connectors 90*a*, 90*b* of the second side frame member 42. This prevents a torque or twisting force being applied to the trolley frame 36. Until the dry brush trolley assembly 34 reaches a far end of the solar panel array being cleaned, the belt 80 will be in direct contact with at least two of the first or second edge posts 66, 70, when present, or will be in continuous contact with one of the first or second array edges 22, 24, thereby also helping to prevent a torque or twisting force being applied to the trolley frame 36. Use of belts 80 also advantageously permits contact along the entire first or second array edge 22, 24 with or without discontinuities such as the edge posts 66 or due to local changes in the array width "B".

Referring to FIG. 4 and again to FIGS. 1-3, second brush set 60 includes an individual brush for each of the module faces 32 of the solar panel array being cleaned. According to several aspects, second brush set 60 therefore includes first, second, third and fourth brushes 60*a*, 60*b*, 60*c*, 60*d*, each having a width substantially equal to module width "A" of one of the first, second, third or fourth panel modules 18*a*, 18*b*, 18*c*, 18*d*. Each of the first, second, third and fourth brushes 60*a*, 60*b*, 60*c*, 60*d* is individually connected to the second cross frame member 40 using a rotatably connected brush support arm 92. Each brush support arm 92 is rotatably connected to second cross frame member 40 using a rotational fastener 94, such that a combined weight of each brush and its support arm acts by gravity to maintain direct contact between the brush and the module face 32.

Figure 4:
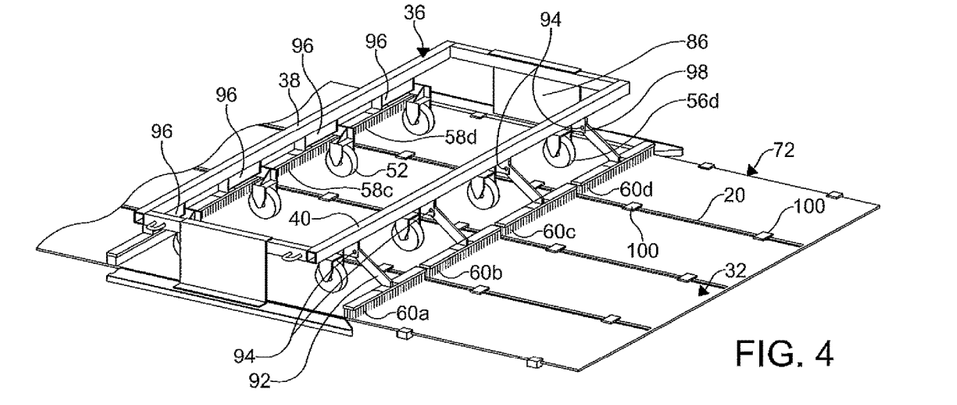
FIG. 4 is a top left perspective view looking toward the right of the dry brush trolley assembly of FIG. 2.

Fifth, sixth, seventh, and eighth brushes 58*a*, 58*b*, 58*c*, 58*d* (only seventh and eighth brushes 58*c*, 58*d* are clearly visible in FIG. 4) are maintained in continuous contact with the module face 32 of each of the individual first, second, third and fourth panel modules 18*a*, 18*b*, 18*c*, 18*d* by a plurality of biasing connectors 96 connecting each brush to the first cross frame member 38 of trolley frame 36. When the tires of the first and second tire sets 46, 55 contact the individual module faces 32, a biasing member (not shown) in each of the biasing connectors 96 is compressed, thereby providing a biasing force pressing the individual fifth, sixth, seventh and eighth brushes 58*a*, 58*b*, 58*c*, 58*d* downwardly onto the module faces 32.

Each tire of the first and second tire sets 46, 55 is connected to either the first or second cross frame member 38, 40 by a wheel mount clevis 98. According to several embodiments the wheel mount clevis 98 design allows tire rotation, but does not permit the tire to turn toward either edge of the solar panel array. As further shown in FIG. 4, panel clips 100 can be used to fix the spacing or width of the individual module gaps 20, and the tires of the first and second tire sets 46, 55 are located to avoid both the individual module gaps 20 and the panel clips 100 to maximize cleaning by the individual brushes.

Figure 5:
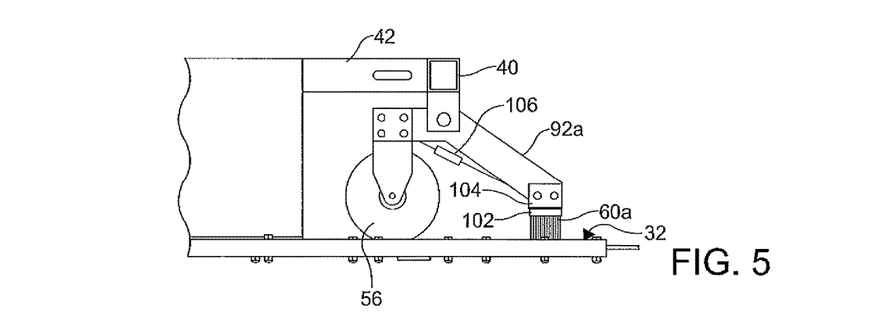
FIG. 5 is a left side elevation view of a rear portion of the dry brush trolley assembly of FIG. 2.
Figure 6:
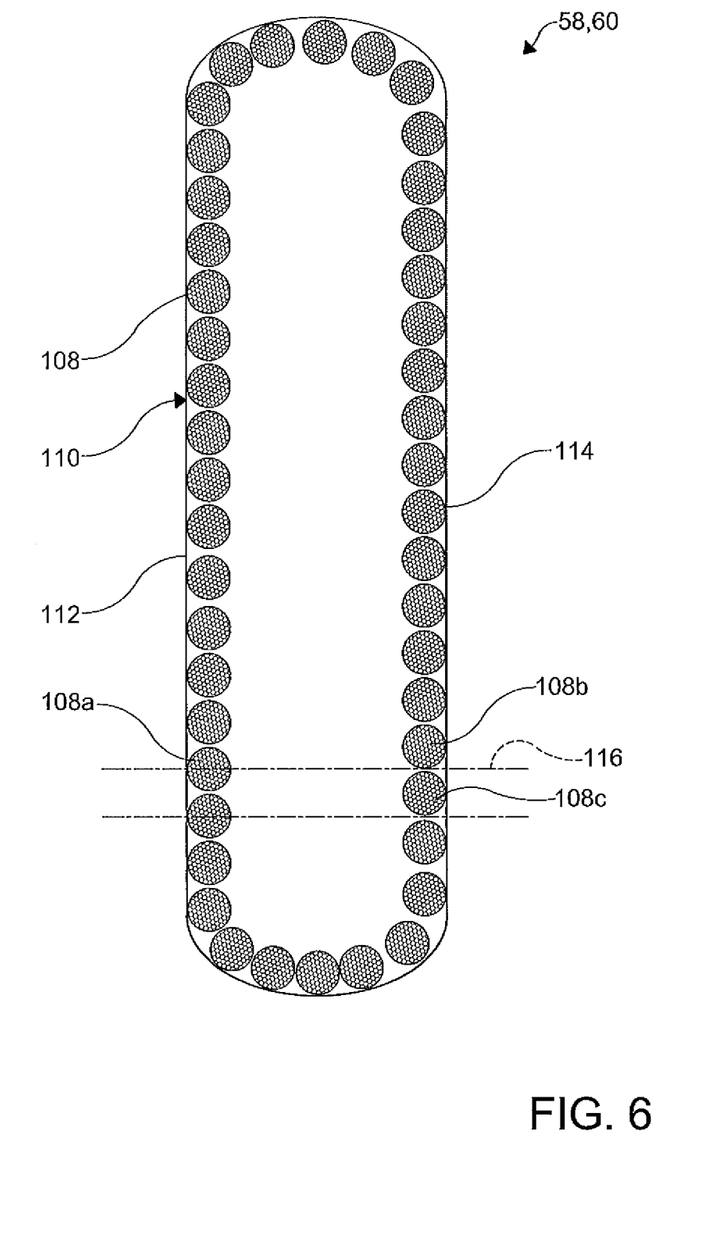
FIG. 6 is a bottom plan view of a brush assembly of the present disclosure.

Referring to FIG. 5 and again to FIGS. 1-4, each of the first, second, third and fourth brushes 60*a*, 60*b*, 60*c*, 60*d*, as well as fifth, sixth, seventh and eighth brushes 58*a*, 58*b*, 58*c*, 58*d* are substantially identical to promote replacement as the brushes wear. Each of the first, second, third and fourth brushes 60*a*, 60*b*, 60*c*, 60*d* (only first brush 60*a* is shown in FIG. 5) is connected to a brush mounting body 102, which is then connected to a brush mounting adapter 104 connected to a free end of each of the brush support arms 92, such as brush support arm 92*a* shown. According to further embodiments, a biasing member 106 can be connected between the brush support arm 92 and structure of second cross frame member 40 to add a positive biasing force acting to maintain contact between the individual first, second, third and fourth brushes 60*a*, 60*b*, 60*c*, 60*d* and the module faces 32.

Referring to FIG. 6 and again to FIGS. 2-5, each brush of the present disclosure is substantially oval in shape and includes multiple brush portions 108 each having multiple bristles which are arranged about an oval-shaped perimeter 110. Each of the multiple brush portions 108 positioned along a first perimeter wall 112 such as a first brush portion 108*a* are aligned between two successive brush portions 108, such as second and third brush portions 108*b*, 108*c* oppositely positioned on a second perimeter wall 114. For example, a center axis 116 of the first brush portion 108*a* extends between second and third brush portions 108*b*, 108c. This alignment ensures every portion of the module face 32 is contacted by at least one of the brush portions 108.

Referring to FIG. 7 and again to FIGS. 1-6, a modular dry brush trolley assembly 118 provides a further embodiment of a solar panel module cleaning system 120 of the present disclosure. Modular dry brush trolley assembly 118 includes a trolley frame 122 made for example of aluminum or other lightweight metal, polymeric. or composite material tubing. According to several embodiments, the trolley frame 122 defines a rectangular shape having parallel first and second cross frame members 124, 126, each having multiple first cross frame member assemblies 124a, 124b, 124c, and second cross frame member assemblies 126a, 126b, 126c. A length of the first and second cross frame member assemblies 124, 126 can be varied for example by a quantity of cross frame sub-members used, for example three cross frame sub-members 128, 130, 132 in the exemplary embodiment, such that a width of the trolley frame 122 corresponds to the width "B" of an array having one, two, three, four, or more panel modules such as the four panel modules 18a, 18b, 18c, 18d presented in FIG. 2. Each of the cross frame sub-members 128, 130, 132 can have a width corresponding to the width of either one or two panel modules. The first and second cross frame member assemblies 124, 126 are optimally oriented substantially perpendicular to the individual module longitudinal centerlines "F" of each of the first, second, third and fourth panel modules 18a, 18b, 18c, 18d as presented in FIG. 2. This perpendicular orientation can vary by several degrees as the modular dry brush trolley assembly 118 is displaced in either the first cleaning direction "D" or the oppositely directed second cleaning direction "E" as presented in FIG. 2, by manual force applied by the first and second technicians $T_1$, $T_2$ positioned on opposite sides of the solar panel array.

Figure 7:
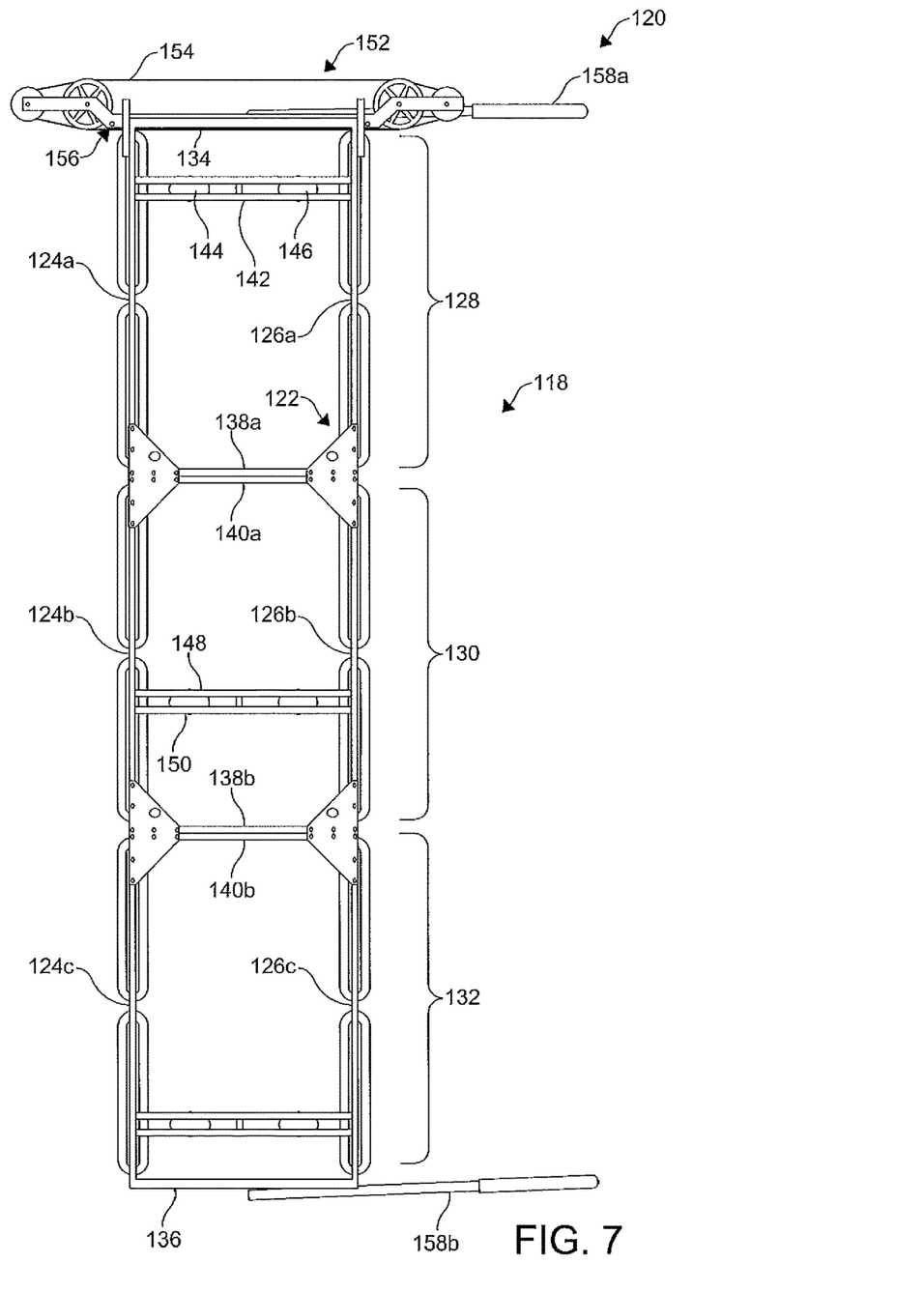
FIG. 7 is a top plan view of another embodiment of a modular dry brush trolley assembly of the present disclosure.

Opposed first and second side frame members 132, 136 are fixedly connected at opposite ends of the outermost ones of the cross frame members such as cross frame members 128, 132. Additional frame members such as first frame members 138a, 138b, and second frame members 140a, 140b can be connected between the first and second cross frame member assemblies 124, 126 to rigidly retain the rectangular shape of modular dry brush trolley assembly 118.

A tire set having two tires is connected to each of the cross frame sub-members 128, 130, 132. Each tire set such as a first tire set 142 includes first and second tires 144, 146 in direct contact one of the panel modules, which can further be individually aligned with or offset from the module longitudinal centerline "F" of one of the first, second, third or fourth panel modules 18a, 18b, 18c, 18d of one of the solar panel arrays of solar panel field 10. Each tire is each made of a resilient material such as a polymeric rubber or similar material to militate against undesired contact or effects to the module faces 32 of the panel modules. Each tire set such as first tire set 142 is connected to the first and second cross frame member assemblies 124, 126 using first and second spacer bars 148, 150, having the tires positioned between and rotatably connected to both of the first and second spacer bars 148, 150.

Similar to modular dry brush trolley assembly 34, modular dry brush assembly 118 includes at least one guide member 152 connected to one of the first or second side frame members 134, 136. Guide member 152 includes a rotating flexible material belt 154 which has a belt face 156 contacting one of the array edges to guide the modular dry brush assembly 118. A second guide member (not shown) which is a mirror image of guide member 152 can be connected to the opposite one of the first or second side frame members 134, 136. First and second force application devices 158a, 158b function similarly to the first and the second force application devices 74a, 74b to push or pull modular dry brush assembly 118.

Referring to FIG. 8 and again to FIG. 7, the cross frame sub-members 128, 130 are releasably connected to each other by joining first frame member 138a to second frame member 140a by fasteners and first and second brackets 160, 162 which are mirror image configurations of each other. Identical first and second brackets 160', 162' can similarly be used to couple the cross frame sub-members 130, 132. Additional sub-members can similarly be connected to suit the quantity of panel modules of the solar array.

Figure 8:
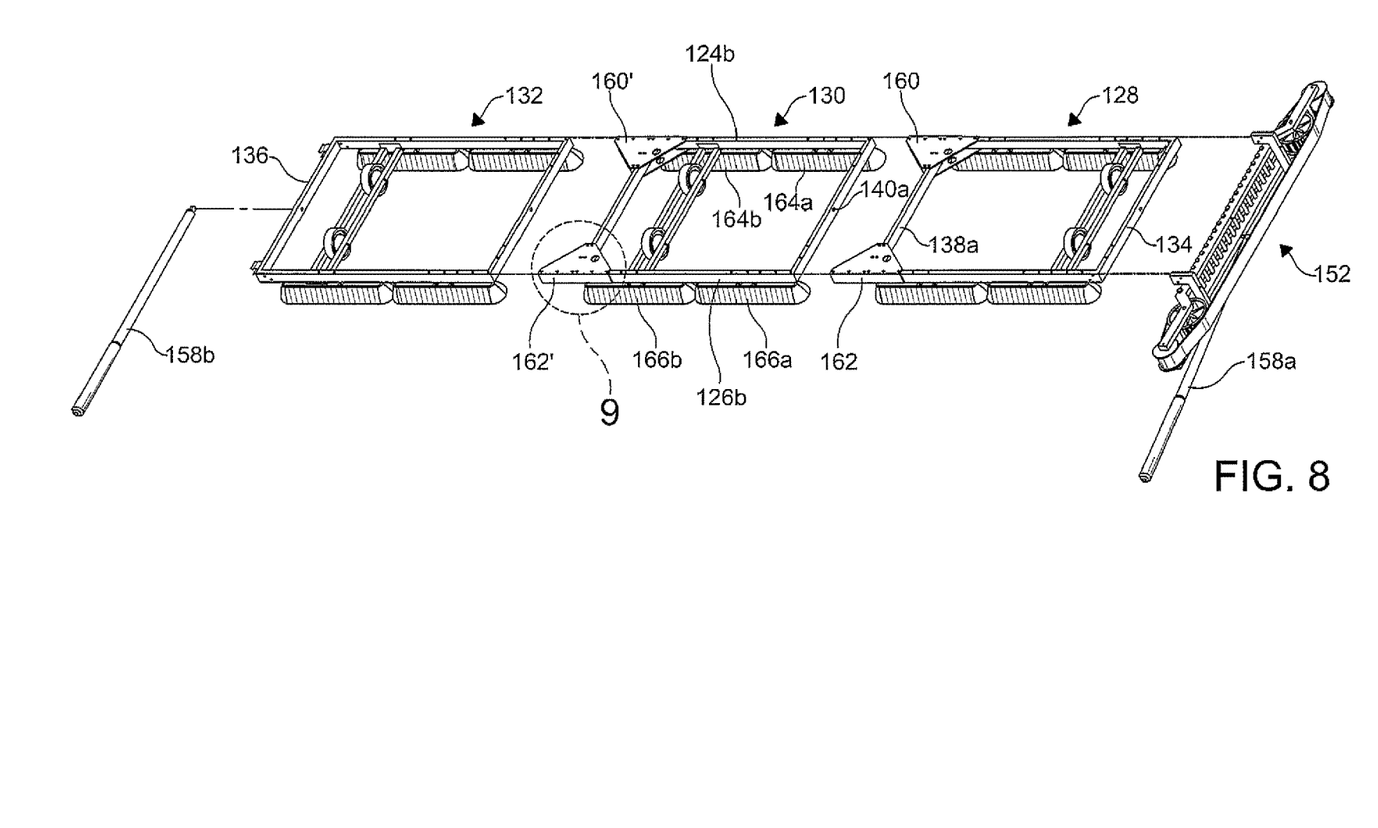
FIG. 8 is a front perspective view of the modular dry brush trolley assembly of FIG. 7.

Each of the cross frame sub-members 128, 130, 132 includes at least one brush set 164 directly beneath and connected to the first cross frame member assembly such as first cross frame member assembly 124b. Each of the cross frame sub-members 128, 130, 132 further includes at least one brush set 166 directly beneath and connected to the second cross frame member assembly such as second cross frame member assembly 126b. When the cross frame sub-members 128, 130, 132 are intended to each clean two panel modules, the brush set 164 will include first and second brushes 164a, 164b and the brush set 166 will include third and fourth brushes 166a, 166b.

Figure 9:
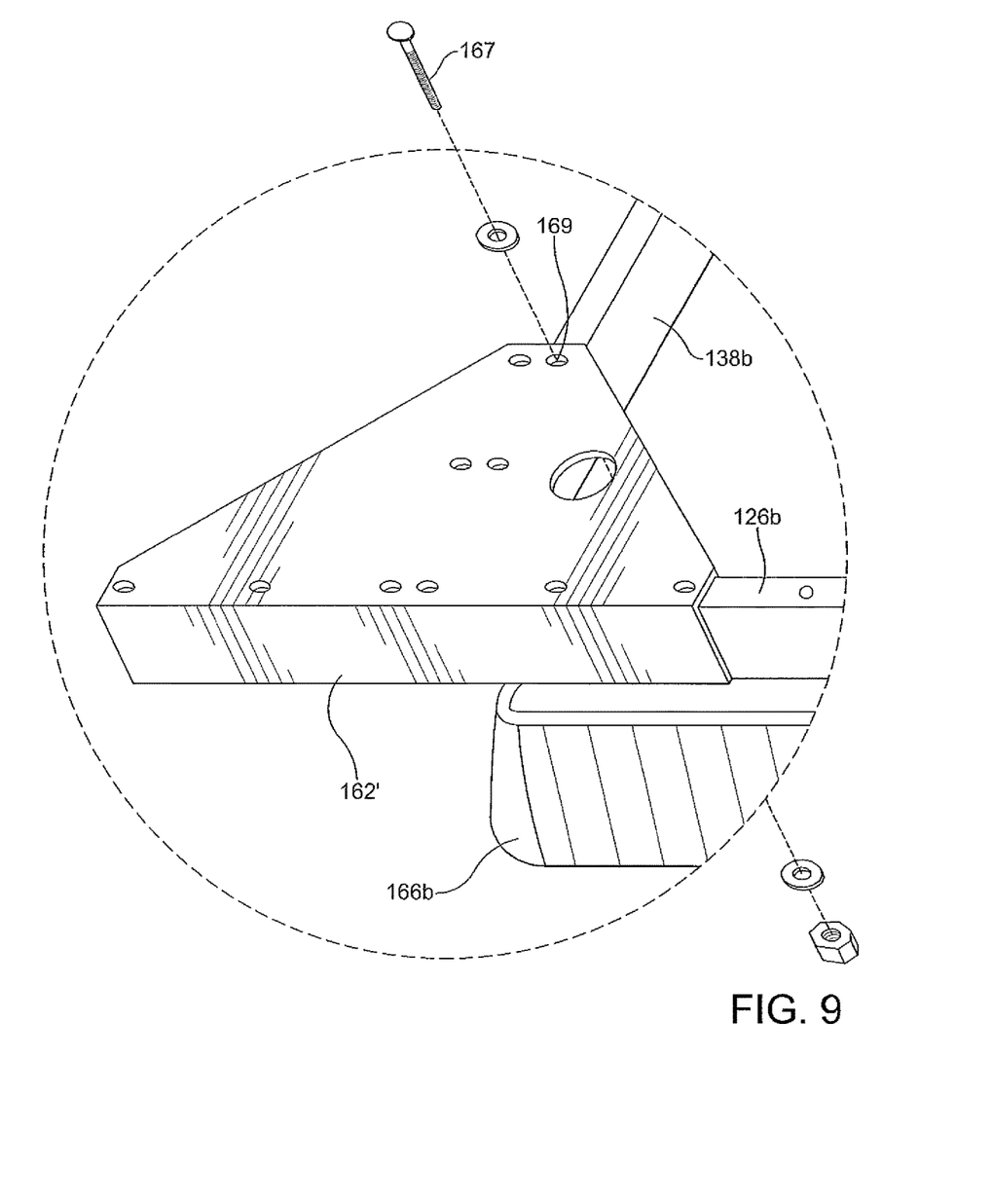
FIG. 9 is a top perspective view of area 9 of FIG. 8.

Referring to FIG. 9 and again to FIGS. 1-2 and 7-8, first bracket 162' is representative of how the first and second brackets 160,160' and 162,162' are installed to assemble the cross frame sub-members such as cross frame sub-members 128, 130, 132 to create the modular dry brush trolley assemblies of the present disclosure. Fasteners 167 are individually installed through individual apertures 169 created in the brackets and through corresponding apertures in either the first or second frame members 138, 140 or the first or second cross frame member assembles 124, 126 to releasably join two cross frame sub-members together. Each cross frame sub-member can include either one or two brushes such as brush 166b on each of its first or second cross frame member assembles 124, 126. Each cross frame sub-member can therefore be used for cleaning either a single panel module or two panel modules.

Referring to FIG. 10 and again to FIGS. 1-3 and 7-9, the guide member 152 is modified from the guide members 62, 64. Guide member 152 includes the belt face 156 of the rotating flexible material belt 154 which directly contacts the outer face 76 of successive ones of the first or second edge posts 66, 70. In embodiments not having first or second edge posts 66, 70 belt face 156 directly contacts either the first or second array edge 22 or 24. When the modules include a frame having an upper face, first and second contact arms 168, 170 each fastened to the first and second guide member bars 172, 174 slidably contact the frame. Each guide member 152 includes one of the belts 154. Each belt 154 contacts first and second spacing wheels 176, 178 rotatably connected to the first and second guide member bars 172, 174. Each belt 154 also contacts first and second tensioning wheels 180, 182 each rotatably connected to a free end 184 or 186 of the first and second guide member bars 172, 174. Each belt 154 is tensioned by outwardly displacing the first and second tensioning wheels 180, 182.

Figure 10:
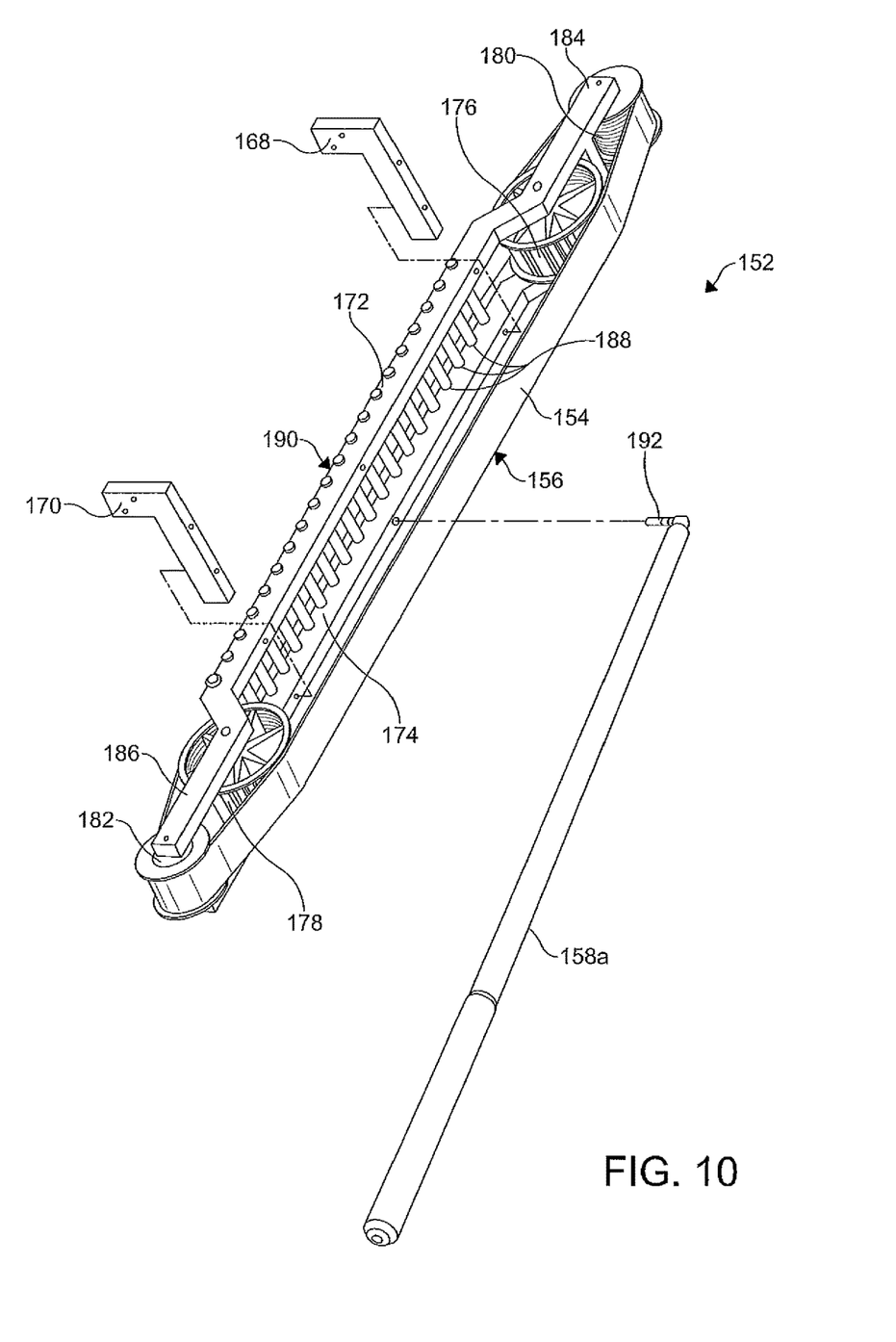
FIG. 10 is a top perspective view of another embodiment of a guide member of the present disclosure.

Multiple belt sleeves 188 are each rotatably connected to the first and second guide member bars 172, 174 and together define a substantially flat belt plane 190. The belt 154 rotates with respect to a perimeter defined by the first and second spacing wheels 176, 178, the first and second tensioning wheels 180, 182 and the belt sleeves 188.

According to several embodiments, each belt 154 defines a tank tread at least on an interior facing surface having repeating raised features engaging complementary raised features of the belt sleeves 184 to provide positive frictional contact. A fastener 192 is used to releasably connect the force application devices such as force application device 158a to the second guide member bar 174.

The total quantity of brushes in first and second brush sets 164, 166 which are used to clean the module faces 32 is directly set to match the quantity of panel modules. To maintain alignment of the dry brush trolley assembly 118 during travel in either of the first or second cleaning directions "A" or "B", the first guide member 152 is connected to the first side frame member 134. According to further embodiments, a second guide member (not shown) is connected to the second side frame member 136. For the first, second and third solar panel arrays 12, 14, 16 shown in FIG. 1 having opposed first and second array edges 22, 24 the first guide member 152 can make direct contact with either the first or the second array edge 22 or 24.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element is referred to as being "on," "engaged to," "connected to," or "coupled to" another element, it may be directly on, engaged, connected or coupled to the other element, or intervening elements may be present. In contrast, when an element is referred to as being "directly on," "directly engaged to," "directly connected to," or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solar panel cleaning brush assembly, comprising:
   a trolley frame having first and second side frame members;
   a first guide member releasably connected to one of the first or second side frame members;
   a first belt rotatably disposed about a perimeter of the at least one guide member and directly contacting a first array edge of a solar panel array, the first belt rotating about the perimeter of the at least one guide member as the trolley frame is displaced along the solar panel array; and
   at least one brush set connected to the trolley frame, the brush set having at least one brush frictionally contacting and spanning across a module face of a solar panel module of the solar panel array.

2. The solar panel cleaning brush assembly of claim 1, wherein the trolley frame includes first and second cross frame members fixedly connected at opposite ends of both the first and second side frame members to complete and rigidly retain a rectangular shape of the brush trolley frame.

3. The solar panel cleaning brush assembly of claim 2, further including:
   a first tire set connected to the first cross frame member; and
   a second tire set connected to the second cross frame member, wherein one tire of each of the first and second tire sets is in direct contact with one of the module faces of each of the multiple solar panel modules of the solar panel array.

4. The solar panel cleaning brush assembly of claim 3, wherein the second tire set includes a quantity of tires equal to a quantity of tires of the first tire set with individual ones of the tires of the second tire set longitudinally aligned with individual ones of the tires of the first tire set.

5. The solar panel cleaning brush assembly of claim 2, further including:
   first and second spacer bars connected to each of the first and second cross frame members; and
   a tire set having first and second tires both rotatably connected to each of the first and second spacer bars, each of the first and second tires in direct contact with one of the module faces of the multiple solar panel modules of the solar panel array.

6. The solar panel cleaning brush assembly of claim 2, wherein the first brush set is connected to the first cross frame member and the second brush set is connected to the second cross frame member.

7. The solar panel cleaning brush assembly of claim 2, wherein the at least one brush set includes first and second brush sets, the first brush set connected to the first cross frame member, the second brush set connected to the second cross frame member, each of the first and second brush sets including multiple brushes each having an oval shape having brush portions on opposed first and second perimeter walls.

8. The solar panel cleaning brush assembly of claim 1, further comprising a second guide member connected to the other one of the first or second side frame members in a mirror image configuration to the first guide member.

9. The solar panel cleaning brush assembly of claim 8, further including a second belt rotatably disposed about a perimeter of the second guide member directly contacting a second array edge of the solar panel array.

10. The solar panel cleaning brush assembly of claim 1, further including first and second manual force application devices each releasably connected to one of the first or second side frame members, the dry brush trolley assembly being manually displaced in either a first cleaning direction or an oppositely directed second cleaning direction by manual force applied using the first and second manual force application devices.

11. The solar panel cleaning brush assembly of claim 1, wherein the first and second cross frame members each include multiple cross frame sub-members, the at least one brush set having two brushes connected to each of the cross frame sub-members.

12. A solar panel cleaning brush assembly, comprising:
a trolley frame having parallel first and second side frame members;
a first guide member connected to one of the first or second side frame members;
a first belt rotatably disposed about a perimeter of the first guide member directly contacting a first array edge of a solar panel array;
first and second cross frame members releasably connected to the first and second side frame members, each of the cross frame members including multiple releasably connected cross frame sub-members; and
at least one brush set connected to each of the cross frame sub-members, the at least one brush set having multiple fixed, non-rotating brushes each frictionally contacting and spanning across a module face of individual ones of multiple solar panel modules defining a solar panel array.

13. The solar panel cleaning brush assembly of claim 12, wherein the at least one brush set includes first and second brush sets connected to the trolley frame, the first and second brush sets each having multiple fixed, non-rotating brushes each frictionally contacting and spanning across a module face of individual ones of multiple solar panel modules defining a solar panel array.

14. The solar panel cleaning brush assembly of claim 13, wherein the first brush set is connected to the first cross frame member, and the second brush set is connected to the second cross frame member.

15. The solar panel cleaning brush assembly of claim 14, further including:
a brush support arm rotatably connecting each of multiple individual brushes of the second brush set to the second cross frame member; and
a rotational fastener rotatably connecting each of the brush support arms to the second cross frame member such that a weight of each of the brushes of the second brush set act to maintain direct contact between multiple brush portions of each of the brushes of the second brush set and the module face of the individual ones of the multiple solar panel modules.

16. The solar panel cleaning brush assembly of claim 12, further comprising:
a second guide member connected to the other one of the first or second side frame members; and
a second belt rotatably disposed about a perimeter of the second guide member directly contacting a second array edge of the solar panel array.

17. A solar panel cleaning brush assembly, comprising:
a trolley frame having two parallel side frame members;
a first guide member connected to one of the side frame members;
a second guide member connected to the other one of the side frame members;
a flexible first tread rotatably disposed about a perimeter of the first guide member directly contacting a first array edge of a solar panel array;
a flexible second tread rotatably disposed about a perimeter of the second guide member directly contacting a second array edge of the solar panel array; and
first and second brush sets connected to the trolley frame, the first and second brush sets each having multiple fixed, non-rotating brushes each frictionally contacting and spanning across a module face of individual ones of multiple solar panel modules defining a solar panel array.

18. The solar panel cleaning brush assembly of claim 17, wherein the trolley frame includes multiple cross frame sub-members releasably connected to each other having two of the multiple cross frame sub-members connected to the side frame members.

19. The solar panel cleaning brush assembly of claim 18, further comprising:
multiple sets of first and second spacer bars connected to each of the cross frame sub-members; and
multiple tire sets each having first and second tires both rotatably connected to one of the multiple sets of the first and second spacer bars, the first and second tires of individual ones of the multiple tire sets in direct contact with one of the module faces of the multiple solar panel modules of the solar panel array.

20. The solar panel cleaning brush assembly of claim 17, wherein each of the first and second guide members comprises:
first and second spacing wheels;
first and second tensioning wheels; and
multiple belt sleeves;
wherein the perimeter of each of the first and second guide members is defined by the first and second spacing wheels, the first and second tensioning wheels, and the multiple belt sleeves.

* * * * *